United States Patent
Kang

(10) Patent No.: US 7,254,320 B2
(45) Date of Patent: Aug. 7, 2007

(54) WATER SUPPLY DEVICE FOR HUMIDIFIER

(75) Inventor: Sang-Keun Kang, Busan (KR)

(73) Assignee: ohsung Co., Ltd. (KR)

( * ) Notice: Subject to any disclaimer, the term of this patent is extended or adjusted under 35 U.S.C. 154(b) by 0 days.

(21) Appl. No.: 11/446,060

(22) Filed: Jun. 2, 2006

(65) Prior Publication Data
US 2007/0104469 A1   May 10, 2007

(30) Foreign Application Priority Data
Nov. 10, 2005   (KR)   ............... 20-2005-0031888

(51) Int. Cl.
*E03B 7/10*   (2006.01)
(52) U.S. Cl. .................. 392/468; 392/465; 392/441
(58) Field of Classification Search .............. None
See application file for complete search history.

(56) References Cited

U.S. PATENT DOCUMENTS

| | | | | |
|---|---|---|---|---|
| 3,275,803 A | * | 9/1966 | True | 219/535 |
| 4,139,761 A | * | 2/1979 | Obrowski | 392/467 |
| 4,224,503 A | * | 9/1980 | Gijzel et al. | 392/480 |
| 4,686,354 A | * | 8/1987 | Makin | 392/472 |
| 5,693,266 A | * | 12/1997 | Jung | 261/142 |

* cited by examiner

*Primary Examiner*—Thor S. Campbell
(74) *Attorney, Agent, or Firm*—Tuchman & Park LLC

(57) ABSTRACT

A water supply device for a humidifier having a water tank for retaining water and a vaporizing chamber for producing water vapor with the water supplied from the water tank, is disclosed in which the water supply device comprises a water tube for supplying the water from the water tank to the vaporizing chamber of the humidifier, the water tube formed of synthetic resin or glass material, and a heating coil disposed around the water tube connected to a electric source for heating the water to a predetermined degree. The water supply device preferably further includes an insulation material wound around the water tube and the heating coil, and a connecting elbow member for securely connecting each end of the water tube to the water chamber and the water tank, respectively.

3 Claims, 2 Drawing Sheets

WATER SUPPLY DEVICE FOR HUMIDIFIER

FIELD OF THE INVENTION

The present application relates to a water supply device for a humidifier for providing suitable humidity to an environment, more particularly to a water supply tube device for connecting between a water tank and a vaporizing chamber of a humidifier, in which the tube is formed of a synthetic resin or glass material in order to provide the vaporizing water without containing harmful or toxic substances therein.

BACKGROUND OF THE INVENTION

As well-known in the art, a humidifier is typically composed of a container body having a water tank installed therein for providing water to a humidifying or vaporizing chamber which produces and emits water vapor to the surrounding air.

A water supply tube in a humidifier connects a water tank to a vaporizing chamber, and is typically made of a metal pipe such as copper. However, such a metal pipe can be corrosive in the water when it is used for an extended period of time while forming harmful corrosive materials, germs, or toxic metallic oxides in the water tube, thus, causing the humidifier to produce harmful water vapor to the air.

SUMMARY OF THE INVENTION

In order to solve the above problems associated in the conventional water supply tube, the present invention provides a water supply tube device for connecting the water tank and vaporizing chamber of a humidifier, in which the water supply tube is formed of a synthetic resin or glass material that can be resistive to formation or accumulation of harmful corrosive materials in the tube in order to provide water vapor or mist without having harmful or toxic substances contained therein.

According to one aspect of the invention, a water supply device for a humidifier having a water tank for retaining water and a vaporizing chamber for producing water vapor with the water supplied from the water tank, is disclosed in which the water supply device comprises: a water tube for supplying the water from the water tank to the vaporizing chamber of the humidifier, the water tube formed of synthetic resin or glass material; and a heating coil disposed around the water tube connected to a electric source for heating the water to a predetermined degree. The water supply device preferably further includes an insulation material wound around the water tube and the heating coil, and a connecting elbow member for securely connecting each end of the water tube to the water chamber and the water tank, respectively.

BRIEF DESCRIPTION OF THE DRAWINGS

The above and other features and advantages of the present invention will become more apparent by describing in detail below with a preferred embodiment thereof with reference to the attached drawings in which.

DETAILED DESCRIPTION OF THE INVENTION

Figure 1:
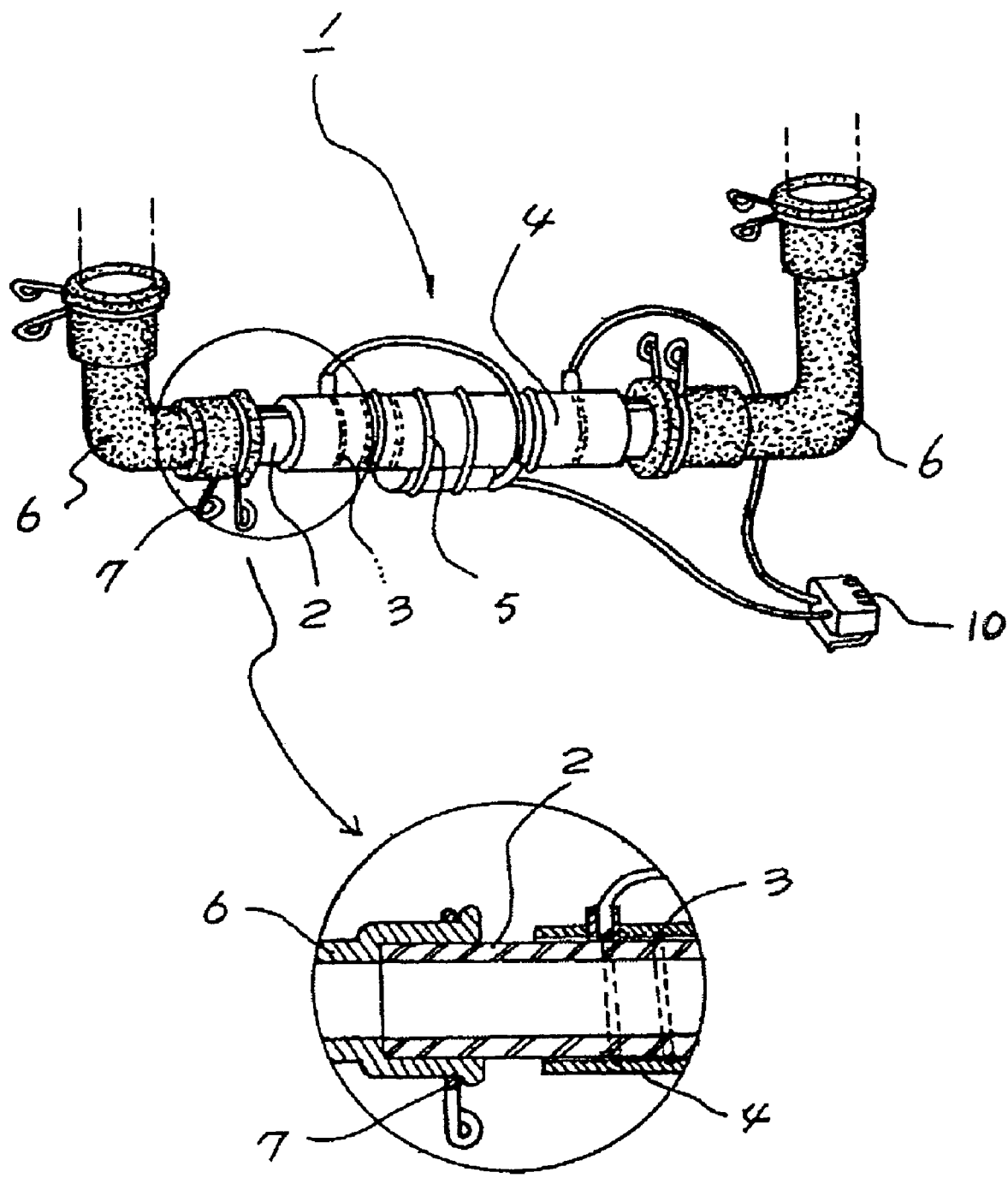
FIG. 1 is a perspective view of the water supply device constructed according to one embodiment of the invention.
Figure 2:
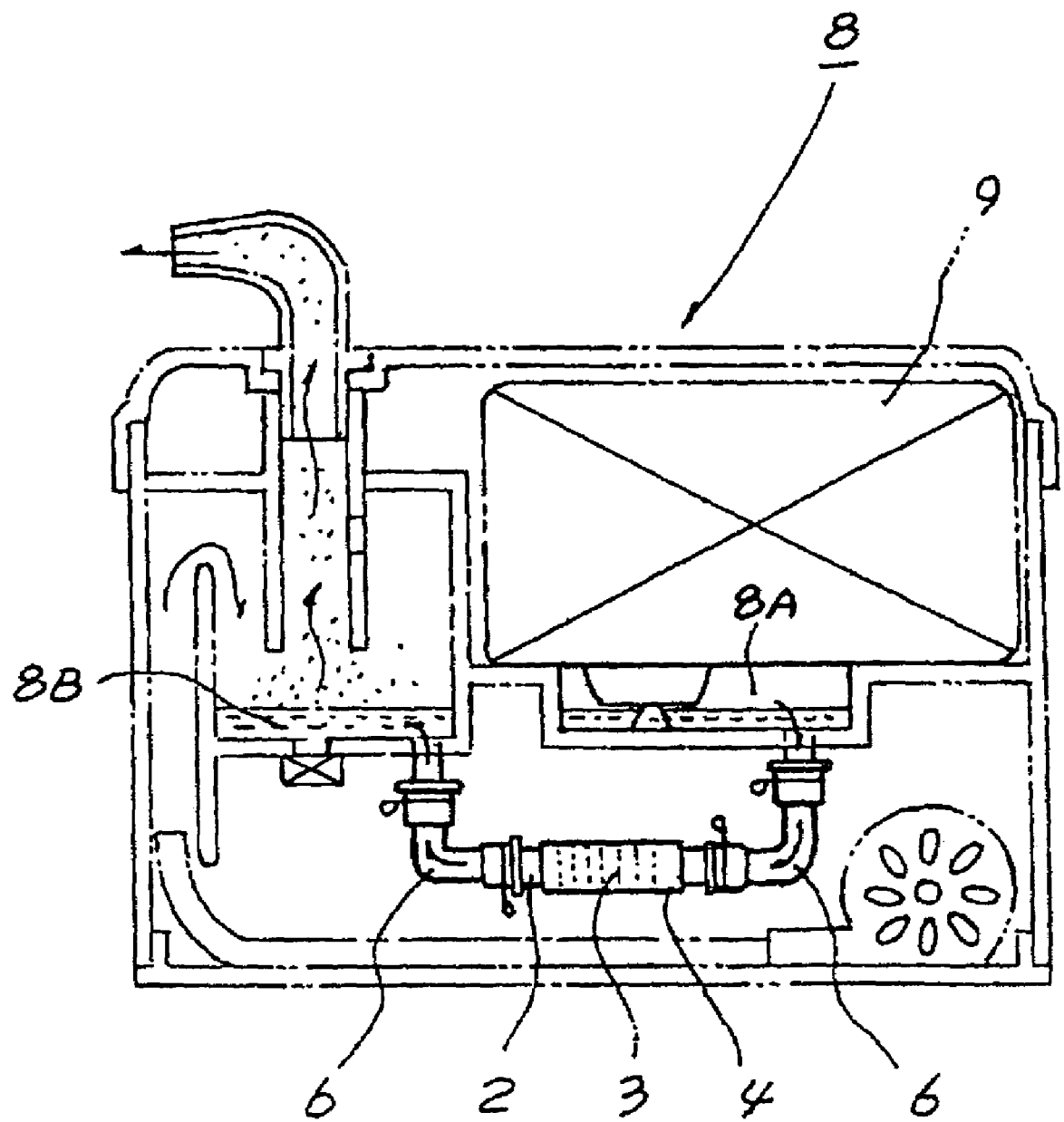
FIG. 2 is a schematic and partially cross-sectional view illustrating an exemplary humidifier incorporating the water supply device of the invention.

Referring to FIGS. 1 and 2, humidifier 8 and water supply device 1 of the invention are further described herein. Humidifier 8 includes a container body having a water tank 9 installed therein for retaining water, and a vaporizing or atomization chamber 8B for producing water vapor or mist by vaporizing element (such as an ultrasonic vibrator) with the water supplied from a water chamber 8A connected to the water tank 9. Water supply device 1 of the invention is connected between the water chamber 8A and the vaporizing chamber 8B for supplying the water contained in the water tank 9 to the vaporizing chamber 8B.

Water supply device 1 includes water tube 2 for supplying water from the water tank 9 (or the water chamber 8A) to the vaporizing chamber 8B. The water tube 2 is formed of a synthetic resin or glass material that can be resistive to formation or accumulation of harmful corrosive materials in the tube in order to provide water vapor without having harmful or toxic substances contained therein. The water supply device 1 further includes heating coil 3 wound around the water tube 2 and connected to an electric source 10 of the humidifier for heating the water to a predetermined degree according to the specification of the humidifier, and insulation material 4, such as asbestos, wound around the tube 2 and the heating coil 3.

The water supply device 1 may optionally include conductive wire 5 wound around the insulation material 4 with each end in electrical connection with the corresponding end of the heating coil 3, in which the conductive wire 5 is in turn electrically connected to the electric source 10 for heating the water to a desired degree. The water supply device 1 may further include connecting elbow members, such as L-shaped rubber elbows 6, for securely connecting each end of the water tube 2 to the water chamber 8A and the vaporizing chamber 8B, respectively. Fastening members, such as fastening wires 7, are provided for the secured connection of the elbow members 7 with the water tube 2.

As described above, the water supply device of the present invention utilizes a water supply tube formed of synthetic resin or glass material that can be corrosive-resistant without producing germs, harmful or toxic substances in the vaporizing water. Moreover, with the heating coils disposed around the water supply tube, the water supply device of the present invention can provide heated water to the vaporizing chamber of the humidifier according to the design and specification of the humidifier.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A water supply device for a humidifier, the humidifier having a water tank for retaining water therein and a vaporizing chamber for producing water vapor or mist with the water supplied from the water tank, the water supply device comprising:
   a water tube for supplying the water from the water tank to the vaporizing chamber of the humidifier, the water tube formed of synthetic resin or glass material;
   a heating coil disposed around the water tube connected to a electric source for heating the water to a predetermined degree;
   an insulation material wound around the water tube and the heating coil; and a conductive wire wound around the insulation material in electrical connection with the heating coil.

2. The water supply device of claim 1, further comprising a connecting elbow member for securely connecting each end of the water tube to the water chamber and the water tank, respectively.

3. The water supply device of claim 2, further comprising a fastening member for the secured connection of the elbow member to the water tube.

* * * * *